June 19, 1956 J. KUYKENDALL 2,751,582
FLARE IGNITING AND DISCHARGING DEVICE
Filed Jan. 4, 1954 2 Sheets-Sheet 1

INVENTOR.
JACK KUYKENDALL
BY
Barnes, Kisselle, Laughlin & Raisch
ATTORNEYS.

United States Patent Office 2,751,582
Patented June 19, 1956

2,751,582
FLARE IGNITING AND DISCHARGING DEVICE

Jack Kuykendall, Detroit, Mich.

Application January 4, 1954, Serial No. 401,912

5 Claims. (Cl. 340—366)

This invention relates to a device for igniting and discharging warning flares and especially concerns a device which is mountable on a vehicle such as a motor truck.

When a motor truck is compelled to stop on a highway or on the shoulder of a highway such as by an obstruction in the road ahead or by mechanical trouble, it is general practice for the driver of the truck to set out flares as a danger warning to the drivers of approaching vehicles. Usually the driver must dismount, walk a distance from the truck, and manually light and place the flare. In the meantime, the truck may be left improperly attended. Further, there is an undesirable time lag between the driver's discovery of the trouble and the actual lighting of the warning flare.

It is an object of this invention to provide a device enabling the driver of a motor truck or other vehicle to quickly and selectively ignite and discharge one or more flares by merely closing the proper electrical switches mounted within the cab. In accordance with the invention a number of flare holders are secured to a support which is adapted for easy mounting on the vehicle. Each flare holder has a discharge opening closed by a replaceable combustible disc. The fuse portion of the flare is urged against the disc by a spring and a small electrical resistant heater element is carried by the disc. When the driver closes the proper switch, the flare is ignited by the energized heating element and the disc is in turn ignited by the burning flare and is destroyed. The flare is then ejected forcibly from the flare holder by the spring. Means are provided for reloading the flare holders and replacing the destroyed disc.

One embodiment of the invention is shown in the accompanying drawings.

Figure 1:
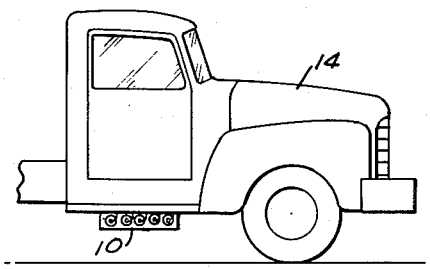
Fig. 1 shows a flare igniting and discharging unit of the present invention mounted under the running board of a motor truck.

The magazine 10 shown in the drawings has a number of flare holders 11 secured to support members 12 and 13 which are adapted to be bolted to the exterior of a motor truck 14. Each flare holder has a round tubular body 17 adapted to hold a flare 18 of the "fusee" type which is of cylindrical form and which has an igniting fuse 19 at one end. The tube is closed at one end as by a plug 21 secured therein by a bolt 22, and the plug provides a seat for a helical spring 23.

The opposite end of the tube is open and provides a discharge opening 24. In the region of its open end the tube has an enlarged portion 27 which may be in the form of a tightly fitting sleeve as shown. The inner and outer end portions 28 and 29 of the sleeve are threaded exteriorly and intermediate the end portions is a projection 30 which preferably has the shape of a hexagonal nut. The outer end of the sleeve 27 projects beyond the open end of the tube.

Figure 2:
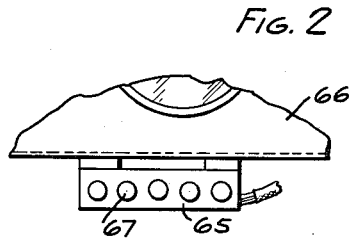
Fig. 2 illustrates a switch box mounted on the instrument panel of a truck and containing switches for setting off the flares.

A nut 35 having an inwardly extending flange 36 is threaded onto the outer end portion 29 of sleeve 27. The flange 36 defines a central opening 37 which is aligned with, and which has a larger diameter than, the discharge opening 24. A heat destructible or combustible disc 40 is inserted within the nut and is firmly clamped around its periphery between the flange 36 and the outer end of the sleeve 27. The disc 40 may be conveniently made of a material such as Celluloid. A bolt 41 extending through a central aperture in the disc 40 and a nut 42 threaded thereon provide means for securing an electrical resistance heating coil 43 to the inner face of the disc (Fig. 2). The shank of the bolt extends outwardly of the disc to provide a post to which an electrical lead 44 may be secured by means of a nut 45.

Each flare holder extends through an opening in the support member 12; the projection 30 on the sleeve 27 and a nut 50 threaded onto the inner end portion 28 of the sleeve engage opposite faces of the support member 12 securing the flare holder thereto. A gasket 51 may be interposed between the nut 50 and the support member 12.

Mounted on the outer face of the support member 12 is a bar 54 of electrically non-conducting material which carries a terminal 55 for each flare holder. One end of each lead 44 is secured to a corresponding terminal. The support members 12 and 13 are provided with bracket elements 56 and 57 having openings 58 and 59, respectively, by which the flare magazine 10 is bolted to the vehicle 14. In the drawings the magazine is shown mounted on the right hand side of the vehicle with the discharge openings 24 of the flare holders directed toward the side or shoulder 62 of the road 63.

Figure 6:
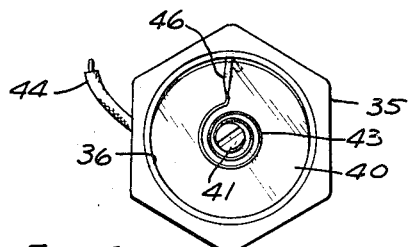
Fig. 6 is an elevational view of a flare holder cap showing the electrical igniter element.
Figure 7:
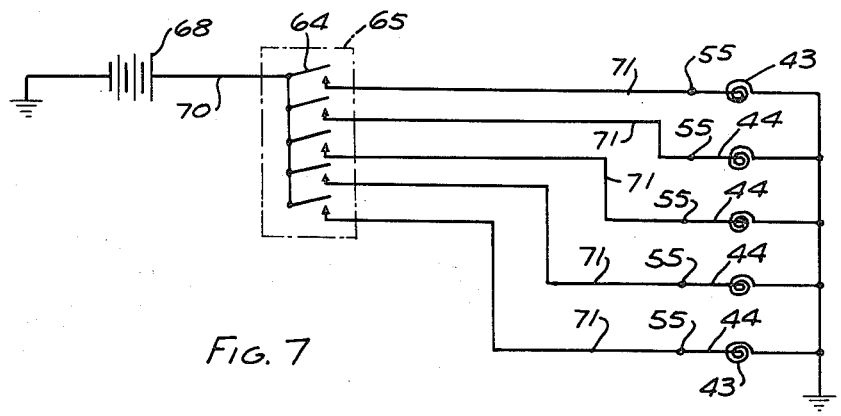
Fig. 7 is a diagram of an electrical circuit suitable for use in conjunction with the invention.

To enable discharging one or more flares while seated within the cab of the truck, there is provided a bank of switches 64, one for each flare holder 17. Switches 64 are preferably mounted within a box 65 which is in turn mounted for convenient access in the cab, on the instrument panel 66, for example. Each switch 64 is arranged to be operated by a push button 67. As is shown in Fig. 6, one side of each switch is connected by a conductor 70 with the vehicle battery 68. Each switch has its other side connected with a corresponding terminal 55 by a conductor 71. As pointed out previously, one lead 44 of each heating coil 43 connects with a corresponding terminal 55. The other lead 46 from each coil is bent over the edge of disc 40 so as to make electrical contact with nut 35 and thus ground the electrical circuit through holder 17 and the frame of the vehicle.

In use a flare 18 is slidably inserted into the tubular body 17 of each flare holder through its opening 24, the bottom 20 of the flare compressing the spring 23. The nut 35 is then screwed onto the threaded end portion 29, and the nut together with the disc 40 caps the end of the tube and holds the flare therein against the force of the spring. The spring urges the igniting fuse 19 of the flare firmly against the head of the bolt 41 and the heater element 43. In order to set out a flare, the driver merely pushes a button 67 which closes a corresponding switch 64 and permits current to flow through a heating coil 43.

Figure 3:
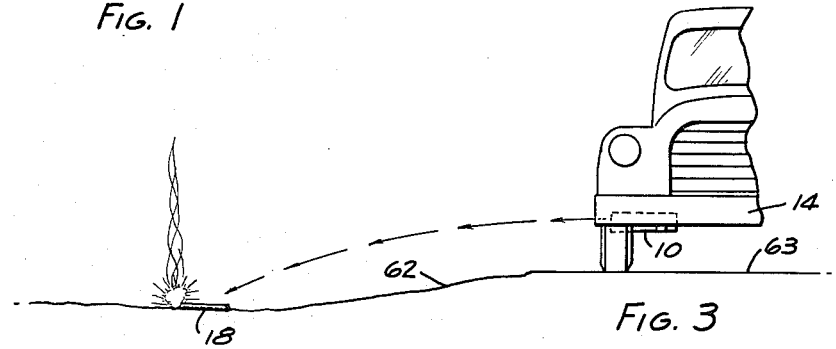
Fig. 3 illustrates the trajectory of a flare upon being discharged from a flare holder.
Figure 4:
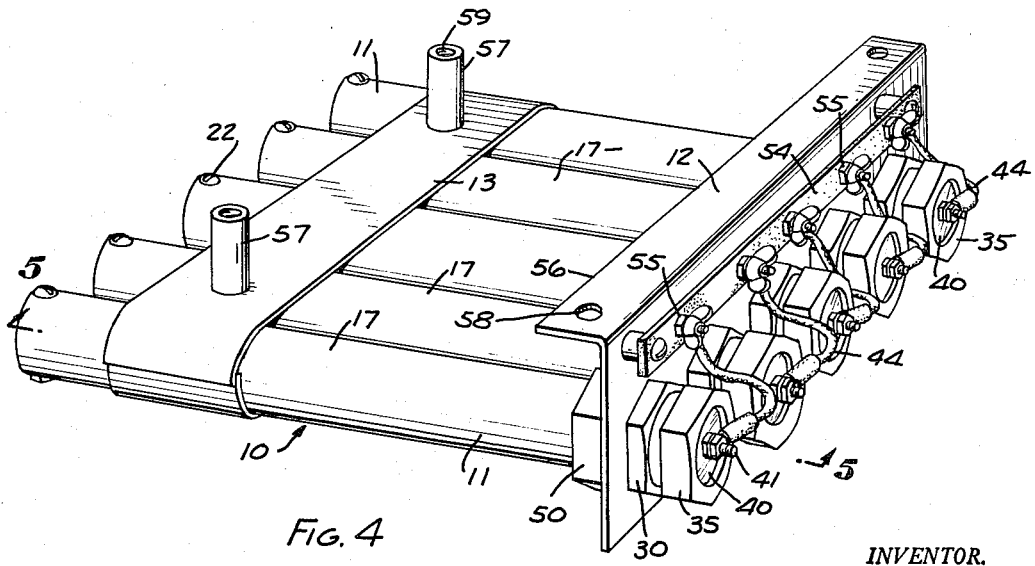
Fig. 4 is a perspective view of a magazine comprised of several flare holders.
Figure 5:
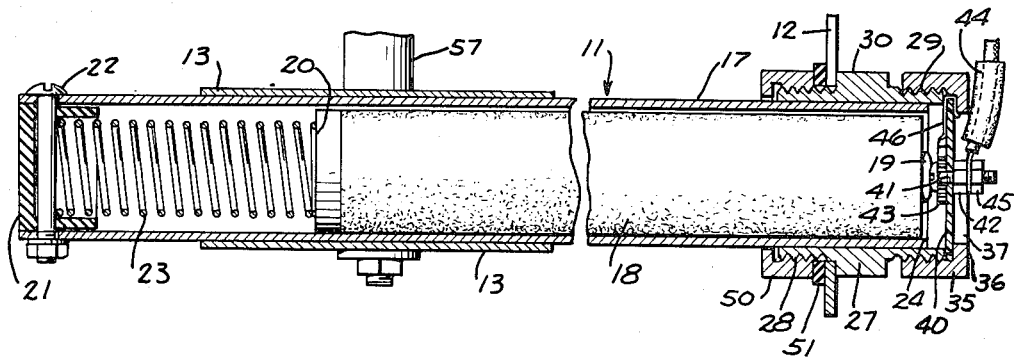
Fig. 5 is a view largely in section taken on line 5—5 of Fig. 4.

The energized coil quickly heats and ignites the fuse 19 and the flame therefrom in turn quickly ignites and destroys the combustible disc 40. The compressed spring 23 then forcibly ejects the burning flare through the discharge opening 24 of the tube in the approximate trajectory illustrated by the arrows in Fig. 3. The flare lands on the shoulder 62 of the road as shown. The driver can thus set out flares without leaving his cab and it is immaterial whether the vehicle is stationary or moving.

The bolt 41 and heating coil 43 remain attached to the lead 44, and hence are not lost when the flare is ignited and discharged. To reload the flare holder, the switch 64 having been opened, nut 35, heating coil 43, bolt 41 and lead 44 are assembled as shown with a new disc 40; a new flare is inserted into the tube and the end of the tube is again capped by the nut 35 and the disc 40 as described.

It will be observed that after the flare has been ignited, the corrosive flame and gases therefrom are directed toward the open end of the flare holder, and that they are confined therein only during the brief period before the combustible disc 40 is destroyed. Hence, damage to the interior of the flare holder is kept to a minimum and any damage which does occur will be at the open end of the tube where it can be easily detected and remedied. It will also be noted that holders 17 are closed at both ends, thus maintaining the flares dry.

I claim:

1. A flare igniting and discharge device comprising, a tube having an open end, said tube being adapted to have a flare inserted therein, spring means in said tube arranged to be stressed by a flare inserted into said tube and tending to discharge the flare therefrom, a member detachably secured to said tube at said open end, said member having an open central portion aligned with said open end, a heat destructible disc secured in said open central portion so that said member and said disc cooperate to form a closure for said open end, said disc being operative to secure a flare in said tube against the action of said spring, a heater element carried by said disc, said heater element being positioned to ignite a flare in said tube, whereby when said heater element is activated to ignite a flare, said disc will be destroyed by the heat therefrom to permit ejecting a flare from said tube by said spring.

2. The combination defined in claim 1 wherein said heater element is an electric heater adapted to be connected into the electrical circuit of a vehicle.

3. The combination defined in claim 1 wherein said heater element is an electrical resistance heater supported at the interior portion of said closure for igniting a flare in said tube, said heater having a terminal projecting through said disc for connection to a source of electrical current.

4. A flare igniting and discharge device comprising, a tube having a closed end, a spring in said tube, said tube having a discharge port, a heat destructible disc closing said discharge port and being arranged to hold said flare in said tube against the action of said spring, a heater element carried by said disc, said heater element being positioned to ignite a flare in said tube so that when said heater element is activated to ignite a flare, said disc will be destroyed by the heat from said flare to permit ejecting the flare from said tube by said spring.

5. A flare igniting and discharge device comprising, a tube closed at one end, a spring at said closed end, the other end of said tube being open, a cap closing said open end and being arranged to keep the interior of said tube dry, said cap including an outer ring detachably connected to said tube adjacent said open end, said ring having an open central portion, a heat destructible disc in said central portion arranged to hold a flare in said tube against the action of said spring, said central portion being of a size to pass a flare, a heater element carried by said disc, said heater element being positioned to ignite a flare in said tube, so that when said heater element is activated to ignite a flare, said disc will be destroyed by the heat therefrom to permit ejecting a flare through said open central portion by said spring.

References Cited in the file of this patent

UNITED STATES PATENTS

| | | |
|---|---|---|
| 785,886 | Jackson | Mar. 28, 1905 |
| 1,650,762 | Machin | Nov. 29, 1927 |
| 2,111,631 | Jones | Mar. 22, 1938 |
| 2,199,990 | Godfrey | May 7, 1940 |